United States Patent [19]

Edwards

[11] 4,069,973
[45] Jan. 24, 1978

[54] THERMAL DISTRIBUTION AND STORAGE SYSTEM FOR SOLAR AND OTHER HEATING AND COOLING

[76] Inventor: Douglas W. Edwards, 5176 Lukens Road, Grove City, Ohio 43123

[21] Appl. No.: 632,525

[22] Filed: Nov. 17, 1975

[51] Int. Cl.² ............................. F24D 5/10; F24H 9/08
[52] U.S. Cl. ............................................. 237/69; 98/31; 165/56; 237/1 A
[58] Field of Search ................. 98/31; 165/49, 53, 56, 165/36; 237/1 A, 69; 126/271; 236/49

[56] References Cited

U.S. PATENT DOCUMENTS

| | | | |
|---|---|---|---|
| 2,190,822 | 2/1940 | Byland | 165/49 X |
| 2,553,302 | 5/1951 | Cornwall | 237/1 A X |
| 2,751,198 | 6/1956 | Rapp | 165/56 |
| 2,966,780 | 1/1961 | Mills | 165/56 X |
| 3,237,546 | 3/1966 | Day, Jr. | 98/31 X |
| 3,415,024 | 12/1968 | Kotlarz | 165/53 X |
| 3,426,177 | 2/1969 | Skypala | 98/31 X |
| 3,516,347 | 6/1970 | May | 98/31 |
| 3,754,595 | 8/1973 | Serratto | 165/36 |

Primary Examiner—William E. Wayner
Assistant Examiner—William E. Tapolcai, Jr.
Attorney, Agent, or Firm—Frank H. Foster

[57] ABSTRACT

An apparatus for the storage of thermal energy and for the distribution of such thermal energy to the interior of a building. The preferred system utilizes prestressed, precast concrete decking panels with hollow cores through which a fluid conducting conduit extends to form a grid within the decking panels. Selected cores have spaced ports communicating with face surfaces of the panels to provide an air flow passage through the selected cores. Fluid from a primary heat storage is controllably circulated through the conduit so that the fluid and the panels provide a secondary storage as well as a heat radiator for continuous even heating while the air flow passages permit forced or gravity flow heating of air for rapidly compensating for an extreme or sudden heat loss.

11 Claims, 2 Drawing Figures

THERMAL DISTRIBUTION AND STORAGE SYSTEM FOR SOLAR AND OTHER HEATING AND COOLING

BACKGROUND OF THE INVENTION

This invention relates generally to equipment for the cooling and heating of homes and is especially well adapted to solar heat sources and more particularly relates to a heat distribution system which provides both storage and improved heat transfer with the ambient air within the building structure.

Solar energy has recently been emerging as an important part of the solution to both energy shortage and pollution problems. Equipment for harnessing the sun's radiated energy promises to provide an inexpensive, clean and efficient means for meeting energy needs. This is particularly true with respect to systems for heating or cooling inhabited building structures.

A typical solar heating system includes a collector for capturing the radiant energy from the sun, a storage device, commonly a large insulated tank of water and a system for distributing the heat from the storage tank to the building structure. Equipment for performing each of these three functions is currently available but, unfortunately, is not competitive in cost with conventional heating systems. Consequently, a substantial developmental effort is currently under way to design less costly equipment in order to make solar heating cost competitive.

While most technical efforts are being directed toward improving the solar collectors and heat storage systems, there is also a need for an improved heat distribution system tailored to the needs of a solar heating system.

The trend has been to use conventional heat exchange systems for heating building structures with solar energy collectors and storage systems. For example, some systems utilize hot water radiators of the type that have been conventionally used for hot water heating systems which heat the water by gas, coal or electrical energy. However, these systems suffer the disadvantages that they were designed for use with water of a higher temperature than ordinarily encountered in solar heating and they are relatively slow to respond to sudden heat losses.

Unfortunately, one of the problems ordinarily encountered in the design of specialized equipment for use with solar heating is the high cost of such specially made parts and equipment relative to the cost of off the shelf component parts and equipment.

OBJECTS AND SUMMARY OF THE INVENTION

It is, therefore, an object of the present invention to provide a heat distribution system having a consistently uniform transfer of heat to the ambient air within a building structure in order to minimize temperature variations and improve human comfort and to simultaneously provide a heat system which has the capacity to supply a relatively quick injection of heat into the ambient air in response to sudden temperature drops caused by extreme heat losses such as the extended opening of a door or window.

In furtherance of the above object, it is additionally an object of the present invention to provide a heat distribution system which provides both radiant heat as well as forced or gravity air heating.

Another object of the invention is to provide a thermal distribution and storage system which can be used for cooling a building structure.

Another object of the present invention is to provide a thermal storage medium which can be used as a secondary storage in a solar heating system and which optimizes the storage capacity of the primary storage of a solar heating system.

It is another object of the present invention to provide a heat distribution system which, in addition to the thermal advantages described, also makes maximum use of currently available building materials and minimizes the use of specialty equipment.

A further object of the present invention is to provide a heat distribution system which is efficient, simple and relatively maintenance free and which may be retrofit on some currently existing building structures.

It is yet another object of the present invention to provide a heat distribution system which can meet the interim performance criteria for solar heating and combined heating and cooling systems promulgated by The U.S. Department of Housing and Urban Development.

Further objects and features of the invention will be apparent from the following specification and claims when considered in connection with the accompanying drawings illustrating the preferred embodiment of the invention.

The invention is an improved thermal distribution and storage apparatus which comprises a panel means formed with a plurality of hollow cores at least one of the cores having an outlet port and an inlet port spaced therefrom in air communication with the space adjacent a face of the panel means. A fluid conduction conduit containing a heat transfer fluid extends through the cores into heat transfer connection with a thermal energy source and forming a closed loop for transferring thermal energy to the panel means. This structure allows a transfer of thermal energy between the face of the panel means by conduits and by radiation and by the forced or gravity flow of air through a core, between the conduit and the core wall, and out the outlet port.

Figure 1:
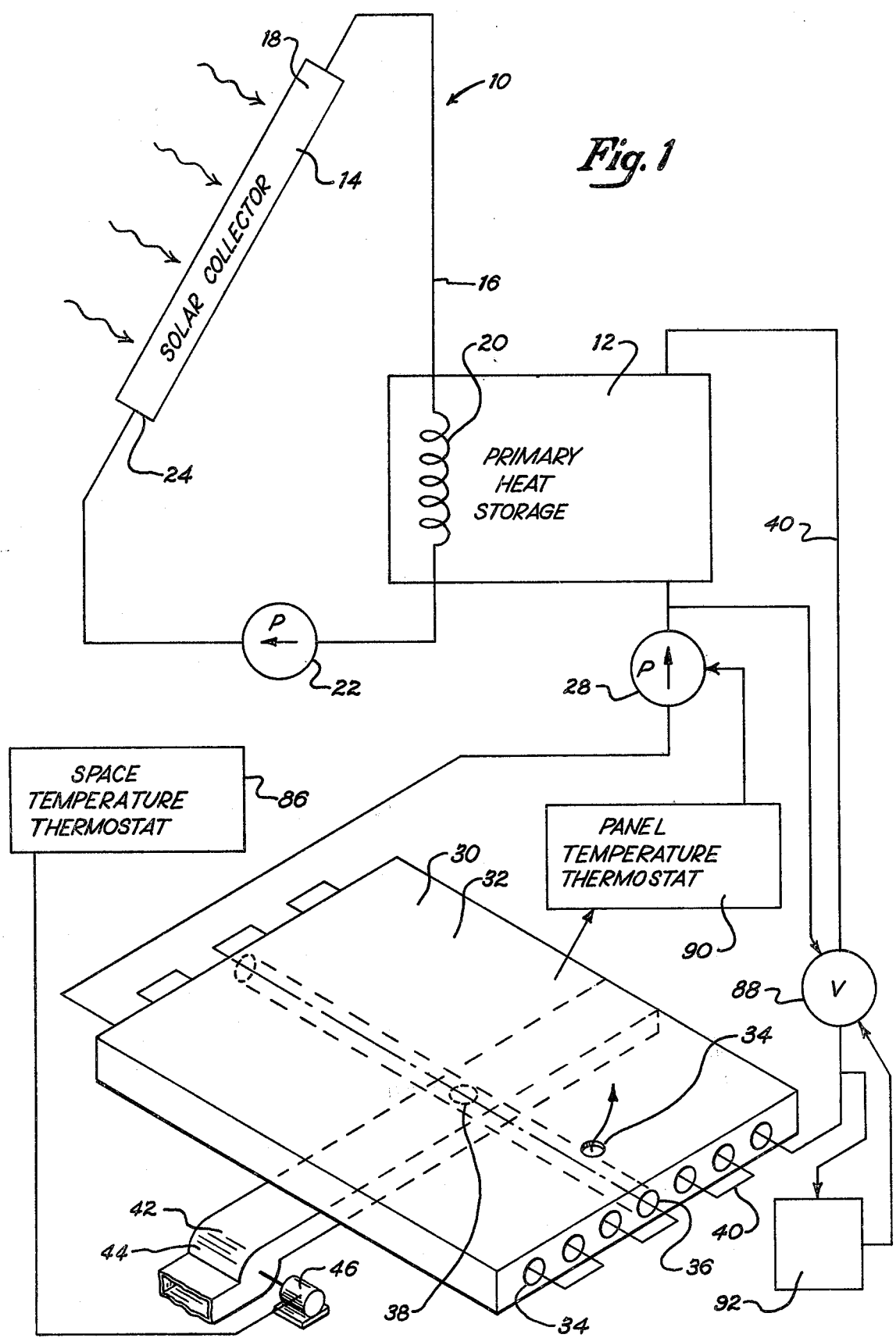
FIG. 1 is a schematic view of the overall solar heating system, including the floor.

The preferred distribution system embodying the present invention utilizes a structural panel member such as a conventional pre-cast and prestressed concrete decking panel 30. Such a panel has opposite face surfaces, such as top surface 32, and is formed with a plurality of hollow cores, such as cores 34 and 36, extending longitudinally from end to end of each panel. These cores are generally parallel to the face surfaces of the panel 30 and at least one of the cores, or preferably selected ones, are formed with an outlet port 34 and an inlet port 38 spaced therefrom and in air communication with the space adjacent a face surface of the panel 30. For example, the panel 30 may form a floor of a building structure and the outlet port 34 may be in communication with the room immediately above the floor.

A fluid conducting conduit 40 extends through the cores and into communication with the primary storage 12 and contains a heat transfer fluid to form a closed loop for transferring heat from the primary storage 12 to within the panel 30. It is not essential that the conduit 40 extend through all of the cores.

The portion of the conduit 40 which is within the core 36 having an outlet port 34 is of significantly smaller outside diameter from the inside diameter of the core. Therefore, the conduit is spaced from the wall of the core 36 in order to form an air flow passageway.

In one embodiment of the invention, an air duct 42 is connected to a blower or air impeller 44 driven by an electric motor 46 in order to force air into the inlet port 38 through the core 36 and out the outlet port 34. With this structure, heat may be transferred by radiation and conduction from the panel face surface directly into the adjacent space and by air flow through the core 38 and out the outlet port 34.

Figure 2:
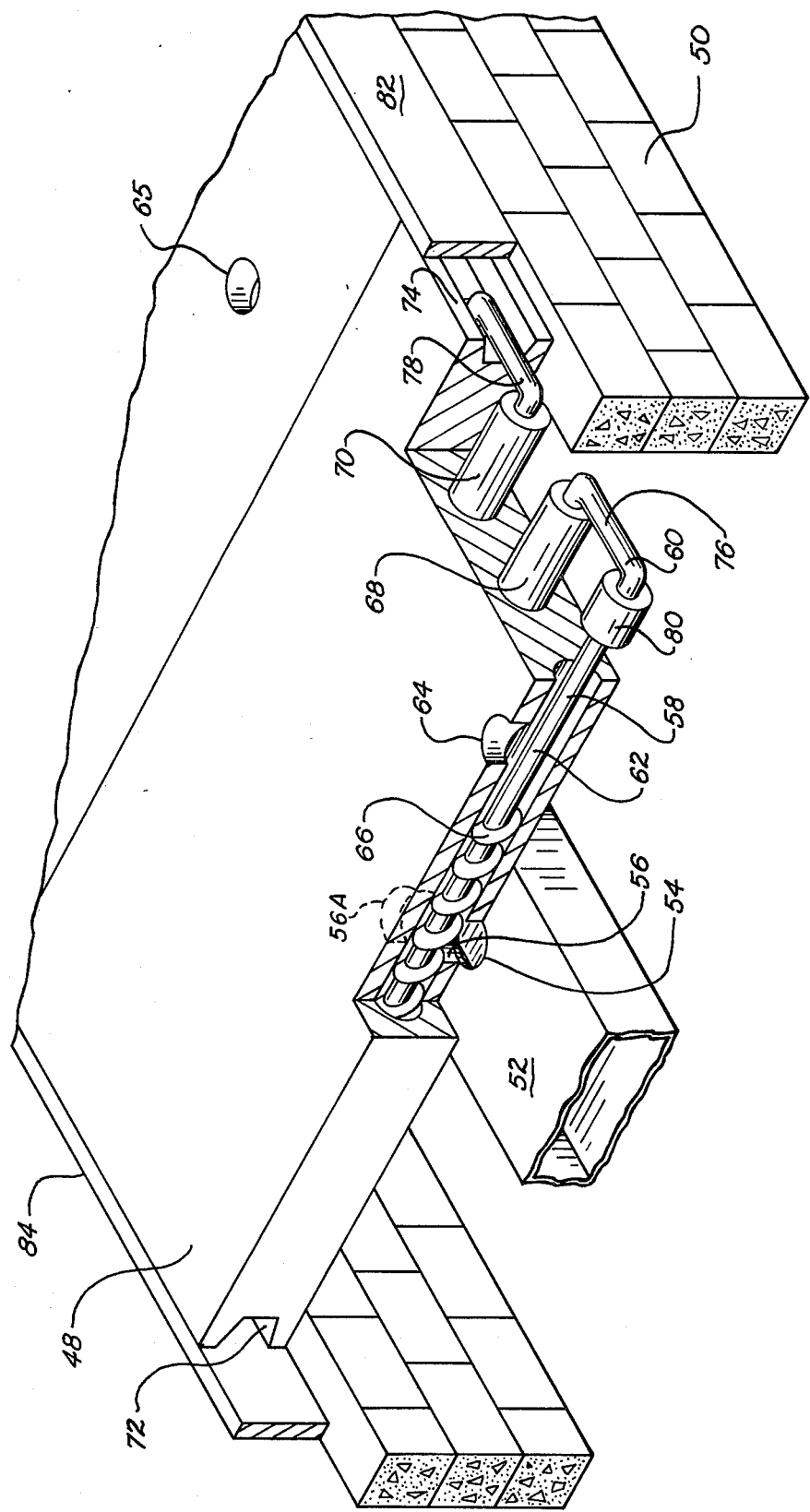
FIG. 2 is a view, partly broken away, of the details of the heated floor.

FIG. 2 illustrates a plurality of prestressed concrete decking panels such as panel 48 supported by a foundation 50 to form a floor. A forced air duct 52 runs laterally and centrally underneath the floor and is provided with openings such as opening 54 communicating with the inlet port 56 which opens into the hollow core 58.

As an alternative, the inlet port may be formed through the same face of the panel as the outlet port 64 as shown at 56A.

The fluid conducting conduit 60 includes a portion 62 having a relatively smaller diameter in the region of the core 58 between the inlet port 56 and the outlet port 64. Extended heating surfaces such as fins 66 are advantageously welded or otherwise attached in heat conductive relationship to the conduit 62 to improve the heat transfer from the conduit 62 to air flowing through the core 58.

Other outlet ports, such as port 65, with a cooperating inlet port can be similarly formed in the panels for heating other rooms or other regions of a single room.

That portion of the conduit 60 which extends through cores which are not ported may be of substaintially larger diameter because an air flow passageway is unnecessary. These larger diameter segments are advantageous because they increase the volume of heat transfer fluid within the panel and, therefore, increase the total heat storage capacity of the panel.

Advantageously, these larger segments of the conduit 60, such as segments 68 and 70, consist of linear segments of plastic or metal tubing which have an outside diameter slightly less than the inside diameter of the cores in order to accommodate thermal expansion.

It is desirable to form lateral channels 72 and 74 in each end of the panels so that the connective portions of the conduit 60, such as connective portions 76 and 78, may extend along these channels from one core to the next. An insulative cylindrical plug 80 of, for example, polystyrene foam is advantageously sealingly inserted in each end of the ported cores to prevent undesirable leakage of warmed air.

Wooden planks or other suitable end caps 82 and 84 are bolted or otherwise anchored to the ends of the panels in order to enclose the conduit 60 in the channels and provide a finished surface.

Returning to FIG. 1, the air impeller 44 may be controlled by an ordinary thermostat 86 which senses the temperature of the ambient room air in the space adjacent each panel. The impeller 44 is activated to provide forced air into the room in response to a temperature drop below a selected temperature level.

Alternatively, a ventilation system which is analogous to the face and bypass system commonly used in commercial buildings might be used. With such an alternative system, unwarmed air from the impeller can also be directed into the adjacent room being proportionally mixed with warmed air by controlled dampers in a ratio determined from room temperature by a suitable control system. The impeller may be continuously operated or may be activated in response to outside temperature.

If desired, some of the hollow cores can be ported as described above but not provided with a fluid conduit. Such ported cores provide convenient ducts for unwarmed air.

In order to provide improved control of the temperature of the heat transfer fluid entering the panel 30, and to provide for the temperature stability of the panel 30, a mixing valve 88 is provided to proportionally mix a portion of the cooler fluid being exhausted from the panel 30 with the warmer fluid from the primary storage 12.

The mixing valve 88 is controlled by a proportional temperature sensing control system 92 which senses the temperature of the heat transfer fluid coming out of the mixing valve 88 and adjusts the proportioning of the inlet fluids in order to provide a selected outlet fluid temperature.

The pump 28 is controlled by a thermostat or temperature detecting system which is responsive to the temperature of the panel 30 itself.

Therefore, in the operation of the preferred embodiment of the invention, when the panel temperature falls below a temperature which is selected by adjustment of the panel thermostat 90, the pump 28 is energized to initiate circulation of the heat transfer fluid in the conduit 40. The mixing valve 88 proportions the cooler fluid out of the pump 28 and the warmer fluid from the heat storage 12 to provide fluid into the panel 30 at a selected temperature. A sudden drop in room temperature will either actuate the space temperature thermostat 86 to energize the blower 44 and instantly provide forced air from the outlet port 34 or alternatively will cause adjustment of the dampers.

The invention inherently allows great versatility and may be embodied in a broad variety of alternative structures. For example, the heated panels of the present invention may be used in multi-story buildings to provide heat throughout the building. The arrangement of inlet and outlet ports may be considerably modified, for example by providing both inlet and outlet ports on the top surface in order to permit continuous gravity air flow into the heated room. Additionally, the panels can be formed with some outlet ports on the underside of the panels and others on the on the top of the panels so that both rooms above and rooms below the panel may be similarly heated. Inlets and outlets may be provided with suitable decorative grills.

Building structures which are currently constructed of prestressed concrete decking panels may be retrofitted with a system embodying the present invention if access is available to its hollow cores. Such retrofit requires the insertion of the conduit and the formation of the inlet and outlet ports.

Because of the relative absence of moving parts in the system, very little maintenance should be required. However, should some defect become apparent in the conduit, the conduits may be withdrawn from the cores and repaired or replaced. To facilitate such withdrawal, it is advantageous to provide a union joint at each end of each linear length of conduit. It is also advantageous to provide manual drains and valves at low points in the system so that the entire system might be manually drained.

The cores can be formed so that the core walls form a portion of the fluid conducting conduit.

It may be desirable in some environments to provide an insulative calcium silicate layer between the upper surface of each panel and the finished interior surface of the adjacent room. Such insulation would prevent the occurrence of a hot interior wall surface while permitting a smooth, even flow of heat into the room. Under other conditions, a carpet may provide sufficient insulation. As yet another alternative, calcium silicate or other suitable insulating material may be mixed in with the concrete prior to casting in order to enhance the insulative characteristics of the panel itself.

As a further alternative, the concepts of the present invention may be used with panels constructed of other materials such as wood and may also be used in forming vertical wall panel members. While one of the important advantages of the present invention is the fact that it is so easily integrated into presently known structural panels, the concepts of the present invention can also be applied to non-load bearing panels.

The heat distribution system of the present invention may further be modified to provide a heat collection system useful in air conditioning the interior of a building. To provide solar air conditioning, a heat operated air conditioner would be connected to withdraw heat from the primary heat storage 12 and the heat distribution system of the present invention would be connected in fluid connection to the cold fluid of the air conditioner. In this manner, cooled fluid would be circulated through the panel and cool the room in a manner analogous to the heating of the room as described in the foregoing.

However, such an air conditioning system is likely to cause moisture condensation within the cores. Consequently, the panels should be slightly inclined at a sufficient pitch and provided with drains to remove any condensation.

Alternatively, the air conditioner can be connected in the air duct 42 to permit cool air to be forced through the outlet ports and distributed about the building structures.

Because the present invention can be used for heating and cooling, the term "thermal energy source" is used in order to include sources for adding heat as well as removing heat from the heat transfer fluid.

From the above it can be seen that I have provided a distribution system which not only makes maximum use of conventionally available building materials and components but additionally provides heat transfer by radiation and conduction as well as by forced air and additionally provides thermal storage in a single, simple structural combination.

It is to be understood that while the detailed drawings and specific examples given describe preferred embodiments of the invention, they are for the purposes of illustration only, that the apparatus of the invention is not limited to the precise details and conditions disclosed and that various changes may be made therein without departing from the spirit of the invention which is defined by the following claims.

I claim:

1. An improved thermal distribution and storage apparatus comprising:
    a. a panel means having opposite face surfaces and formed with a plurality of hollow cores generally parallel to said face surfaces, at least one of said cores having an outlet port and having an inlet port spaced therefrom in air communication with a space adjacent a face surface of said panel means; and
    b. a liquid conducting conduit extending through said cores and connected in heat transfer connection to a thermal energy source, said conduit containing a heat transfer liquid and forming a closed loop for transferring heat between said thermal energy source and said panel means, the exterior of the portion of the conduit which is within a ported core being spaced from the wall of its core to form an air flow passageway and the exterior of the major portion of the conduit which is within a core but not within an air flow passageway extending substantially to the core wall; wherein heat may be transferred between a panel face surface and said adjacent space by radiation and conduction and by the flow of air from said outlet port into said adjacent space.

2. An apparatus according to claim 1 wherein said outlet port is formed through a face surface of said panel means.

3. An apparatus according to claim 2 wherein said inlet port is formed through the opposite face surface of said panel means.

4. An apparatus according to claim 2 wherein said inlet port is formed through the same face of said panel means.

5. An apparatus according to claim 1 wherein a fluid mixing valve has its outlet connected to a panel input end of said conduit and its inlets connected one to the outlet of said thermal energy source and the other to the panel outlet end of said conduit for proportionately mixing its input fluids.

6. An improved thermal distribution and storage apparatus comprising:
    a. a panel means having opposite face surfaces and formed with a plurality of hollow cores generally parallel to said face surfaces, at least one of said cores having an outlet port and having an inlet port spaced therefrom in air communication with a space adjacent a face surface of said panel means; and
    b. a fluid conducting conduit extending through said cores and connected in heat transfer connection to a thermal energy source, said conduit containing a heat transfer fluid and forming a closed loop for transferring heat between said thermal energy source and said panel means, the exterior of the portion of the conduit which is within a ported core being spaced from the wall of its core to form an air flow passageway;

wherein heat may be transferred between a panel face surface and said adjacent space by radiation and conduction and by the flow of air from said outlet port into said adjacent space; and wherein a fluid pump is provided in said conduit and is controlled by a switching means which is responsive to the temperature of said panel means.

7. An apparatus according to claim 6 wherein a ventilation system including an air impeller is connected in communication with said ported core and is controlled by a control means which is responsive to the temperature of the space adjacent said panel means.

8. An improved thermal distribution and storage apparatus comprising:
    a. a plurality of concrete decking panels arranged edge to edge to form a floor, having opposite face surfaces and formed with a plurality of hollow cores generally parallel to said face surfaces, at least one of said cores having an outlet port and having an inlet port spaced therefrom in air communication with a space adjacent a face surface of said panel means; and b. a fluid conducting conduit extending through said cores and connected in heat transfer connection to a thermal energy source, said conduit containing a heat transfer fluid and forming a closed loop for transferring heat between said thermal energy source and said panel means, the exterior of the portion of the conduit which is within a ported core being spaced from the wall of its core to form an air flow passageway and the exterior of the major portion of the conduit which is not within an air flow passageway being of substantial diameter and substantially unfinned wherein heat may be transferred between a panel face surface and said adjacent space by radiation and conduction and by the flow of air from said outlet port into said adjacent space.

9. An apparatus according to claim 8 wherein a plurality of outlet ports are formed through the upper face surface of said panel means for providing air flow outlets and wherein the portions of said conduit within ported cores are provided with extended surfaces for increasing the heat transfer to air flowing through said cores; and wherein a lateral channel is formed in each end of said decking panels and portions of said conduit extend along said channel from one core to another and wherein insulative plugs are sealingly inserted in each end of the ported cores.

10. An apparatus according to claim 9 wherein a layer of insulative material is positioned upon the upper layer of said panel means.

11. An apparatus according to claim 9 wherein a plank is anchored to the ends of said panel means enclosing said conduit in said channels.

* * * * *